US008651502B2

(12) United States Patent
Winterhalter et al.

(10) Patent No.: US 8,651,502 B2
(45) Date of Patent: Feb. 18, 2014

(54) LATCH DEVICE FOR COUPLING A CARRIER TO A STROLLER FRAME

(75) Inventors: Andrew Winterhalter, West Lawn, PA (US); Steve Wood, Kutztown, PA (US)

(73) Assignee: Nuna International B.V., Amsterdam (NL)

( * ) Notice: Subject to any disclaimer, the term of this patent is extended or adjusted under 35 U.S.C. 154(b) by 230 days.

(21) Appl. No.: 13/085,334

(22) Filed: Apr. 12, 2011

(65) Prior Publication Data

US 2011/0278810 A1 Nov. 17, 2011

Related U.S. Application Data

(60) Provisional application No. 61/395,462, filed on May 13, 2010.

(30) Foreign Application Priority Data

Nov. 30, 2010 (CN) .......................... 2010 1 0573531

(51) Int. Cl.
*B62B 7/08* (2006.01)
*B62B 7/00* (2006.01)

(52) U.S. Cl.
CPC ..................................... *B62B 7/006* (2013.01)
USPC ........................... 280/47.4; 280/643; 280/648

(58) Field of Classification Search
CPC .................................. B62B 7/08; B62B 7/006
USPC ............ 280/33.993, 642, 643, 647, 648, 650, 280/658, 47.38, 47.39
See application file for complete search history.

(56) References Cited

U.S. PATENT DOCUMENTS

| 4,834,403 | A | * | 5/1989 | Yanus et al. ..................... 280/30 |
|---|---|---|---|---|
| 5,028,061 | A | * | 7/1991 | Hawkes ....................... 280/47.4 |
| 5,201,535 | A | * | 4/1993 | Kato et al. ...................... 280/30 |
| 5,203,577 | A | * | 4/1993 | Kato et al. ...................... 280/30 |
| 5,257,799 | A | * | 11/1993 | Cone et al. ................... 280/642 |
| 5,277,472 | A | * | 1/1994 | Freese et al. .................. 297/130 |
| 5,364,137 | A | * | 11/1994 | Shimer ........................ 297/327 |
| 5,564,778 | A | * | 10/1996 | Shimer et al. ................. 297/130 |
| 5,567,008 | A | * | 10/1996 | Cone, II .................... 297/256.16 |
| 5,676,386 | A | * | 10/1997 | Huang ........................... 280/30 |
| 5,772,279 | A | * | 6/1998 | Johnson, Jr. .................. 297/130 |
| 5,794,951 | A | * | 8/1998 | Corley et al. ................... 280/30 |
| 5,947,555 | A | * | 9/1999 | Welsh et al. .................. 297/130 |
| 6,086,086 | A | * | 7/2000 | Hanson et al. ................ 280/650 |
| 6,089,653 | A | * | 7/2000 | Hotaling et al. .............. 297/130 |
| 6,286,844 | B1 | * | 9/2001 | Cone et al. ................. 280/47.41 |

(Continued)

*Primary Examiner* — Hau Phan
*Assistant Examiner* — Jacob Meyer
(74) *Attorney, Agent, or Firm* — Christensen O'Connor Johnson Kindness PLLC

(57) ABSTRACT

A latch device is adapted for coupling a detachably a carrier to a stroller frame, and includes a latch tongue, a latch housing, and a locking member. The latch tongue is mounted on the stroller frame, and has a cam surface and an abutment surface. The latch housing is connected to the latch tongue and is coupled detachably to the carrier. The locking member is connected to the latch housing and includes a latch arm. The locking member is movable relative to the latch housing between a locked position, where the latch tongue is locked to the locking member, and an unlocked position, where the latch tongue is unlocked from the locking member and a slide block of the latch arm abuts against the abutment surface so as to maintain the locking member at the unlocked position. The slide block slides along the cam surface when the locking member is moved toward the unlocked position.

20 Claims, 14 Drawing Sheets

(56) References Cited

U.S. PATENT DOCUMENTS

| | | | |
|---|---|---|---|
| 6,318,807 B1* | 11/2001 | Perego | 297/440.22 |
| 6,446,990 B1* | 9/2002 | Nania et al. | 280/47.371 |
| 6,572,134 B2* | 6/2003 | Barrett et al. | 280/650 |
| 6,595,583 B2* | 7/2003 | Hou | 297/130 |
| 6,793,280 B2* | 9/2004 | Washizuka et al. | 297/130 |
| 6,802,514 B2* | 10/2004 | Worth et al. | 280/30 |
| 6,863,286 B2* | 3/2005 | Eros et al. | 280/47.38 |
| 6,942,294 B2* | 9/2005 | Takamizu | 297/256.16 |
| 6,983,986 B2* | 1/2006 | Santamaria | 297/130 |
| 7,032,922 B1* | 4/2006 | Lan | 280/648 |
| 7,070,197 B2* | 7/2006 | Chen | 280/642 |
| 7,207,628 B2* | 4/2007 | Eros | 297/297 |
| 7,370,913 B2* | 5/2008 | Takamizu et al. | 297/256.16 |
| 7,377,537 B2* | 5/2008 | Li | 280/650 |
| 7,681,894 B2* | 3/2010 | Santamaria | 280/47.38 |
| 7,686,322 B2* | 3/2010 | Longenecker et al. | 280/642 |
| 7,694,996 B2* | 4/2010 | Saville et al. | 280/642 |
| 7,753,398 B2* | 7/2010 | Yang | 280/642 |
| 8,029,014 B2* | 10/2011 | Ahnert et al. | 280/650 |
| 8,070,228 B2* | 12/2011 | Karremans et al. | 297/256.16 |
| 8,172,253 B2* | 5/2012 | Song | 280/642 |
| 8,282,120 B2* | 10/2012 | Minato et al. | 280/647 |
| 8,382,150 B2* | 2/2013 | Williams et al. | 280/648 |
| 2001/0013689 A1* | 8/2001 | Cone et al. | 280/47.41 |
| 2005/0264062 A1* | 12/2005 | Longenecker et al. | 297/250.1 |
| 2006/0214397 A1* | 9/2006 | Dotsey et al. | 280/647 |
| 2007/0257458 A1* | 11/2007 | Dotsey et al. | 280/47.38 |
| 2007/0296182 A1* | 12/2007 | Saville et al. | 280/642 |
| 2008/0136127 A1* | 6/2008 | Chen et al. | 280/30 |
| 2008/0231023 A1* | 9/2008 | Yang | 280/650 |
| 2010/0219616 A1* | 9/2010 | Dotsey | 280/642 |
| 2010/0230933 A1* | 9/2010 | Dean et al. | 280/647 |
| 2012/0025492 A1* | 2/2012 | Grintz et al. | 280/647 |

\* cited by examiner

LATCH DEVICE FOR COUPLING A CARRIER TO A STROLLER FRAME

CROSS-REFERENCE TO RELATED APPLICATIONS

This application claims priority of U.S. Provisional Application No. 61/395,462, filed on May 13, 2010, and Chinese Application No. 201010573531.1, filed on Nov. 30, 2010.

BACKGROUND OF THE INVENTION

1. Field of the Invention

The invention relates to a latch device, more particularly to a latch device for coupling a carrier, such as a carrycot or a safety car seat, to a stroller frame.

2. Description of the Related Art

A stroller with a detachable carrier comprises a stroller frame, and a carrier, such as a carrycot or a safety car seat, coupled detachably to the stroller frame. The carrier is generally coupled to the stroller frame through a pair of latch devices. When detaching the carrier from the stroller frame, a user has to unlock the latch devices simultaneously, and lift the carrier up while maintaining the latch devices to be unlocked so as to separate the carrier from the stroller frame. However, when the user's two hands are unlocking respectively the latch devices, it is difficult for the user to lift the carrier up at the same time, not to mention the situation that the user is using one hand to hold an infant.

SUMMARY OF THE INVENTION

Therefore, an object of the present invention is to provide a latch device that can be maintained at an unlocked state without being held by a user, so that the user is able to detach easily and independently a carrier from a stroller frame.

Another object of the present invention is to provide a stroller that includes a carrier coupled detachably to a stroller frame through the abovementioned latch device.

Accordingly, a latch device of the present invention is adapted for coupling detachably a carrier to a stroller frame. The latch device comprises a latch tongue, a latch housing, and a locking member. The latch tongue is adapted to be mounted on the stroller frame, and has a cam surface and an abutment surface that is adjacent to the cam surface. The latch housing is coupled detachably to the latch tongue and is adapted to be connected to the carrier. The locking member includes a latch arm, and is movable relative to the latch housing between a locked position, where the latch tongue is locked to the locking member, and an unlocked position, where the latch tongue is unlocked from the locking member and a slide block of the latch arm abuts against the abutment surface of the latch tongue so as to maintain the locking member at the unlocked position. The slide block of the latch arm slides along the cam surface of the latch tongue when the locking member is moved from the locked position toward the unlocked position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
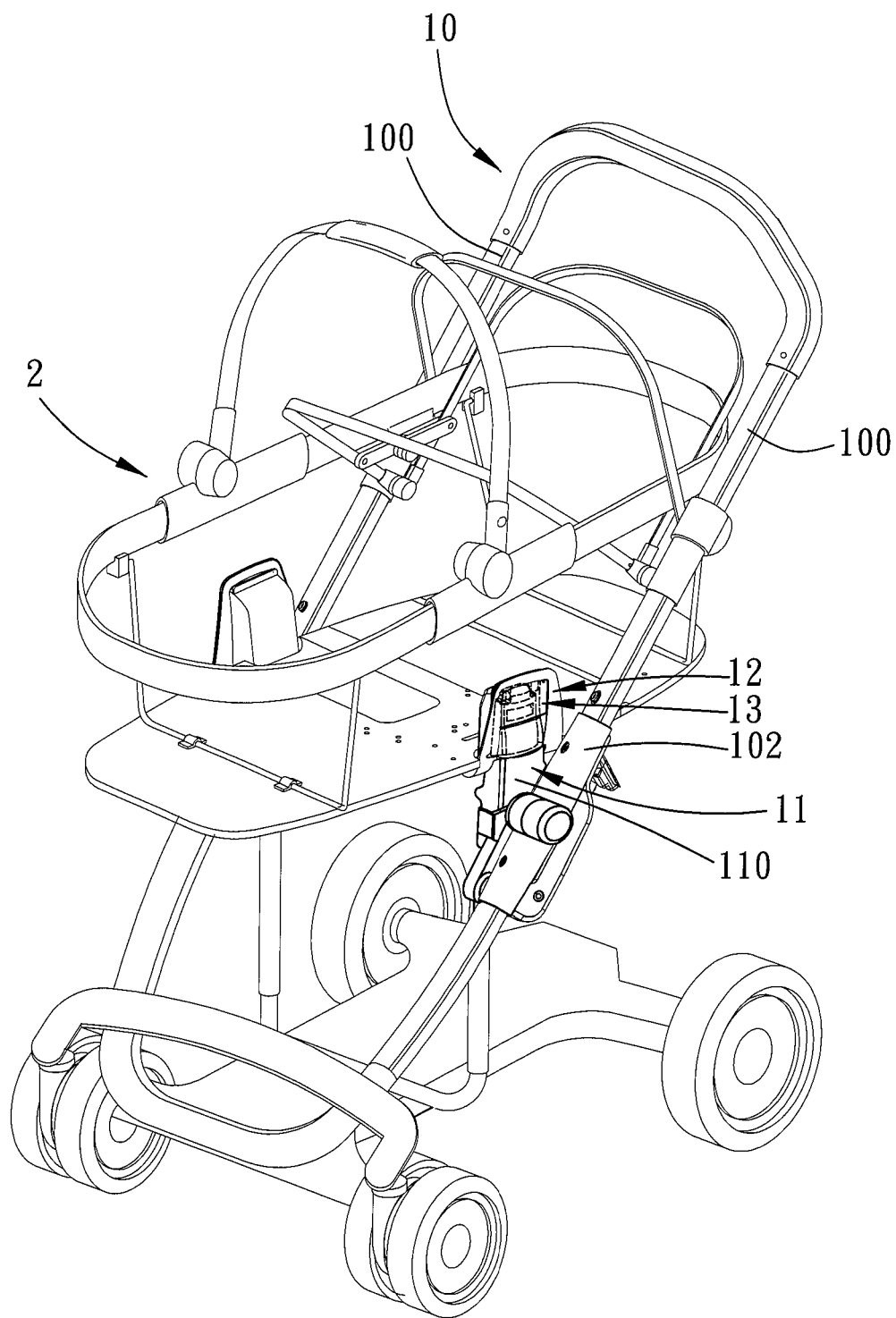
FIG. 1 is a perspective view of a stroller mounted with a preferred embodiment of a latch device according to the invention.

As shown in FIG. 1, the preferred embodiment of a latch device according to the present invention is adapted for coupling detachably a carrier 2 to a stroller frame 10. The carrier 2 may be a carrycot or a safety car seat. In this embodiment, the stroller frame 10 includes a pair of lateral frame rods 100, and a pair of coupling members 102 (see FIG. 9) mounted respectively on the lateral frame rods 100. Each of the coupling members 102 connects a latch device of this invention to a respective one of the lateral frame rods 100. Since the structure of the stroller frame 10 is symmetrical in a left-right direction, only one latch device of this invention, one coupling member 102 and one lateral frame rod 100 will be mentioned in the following description for the sake of brevity.

Figure 2:
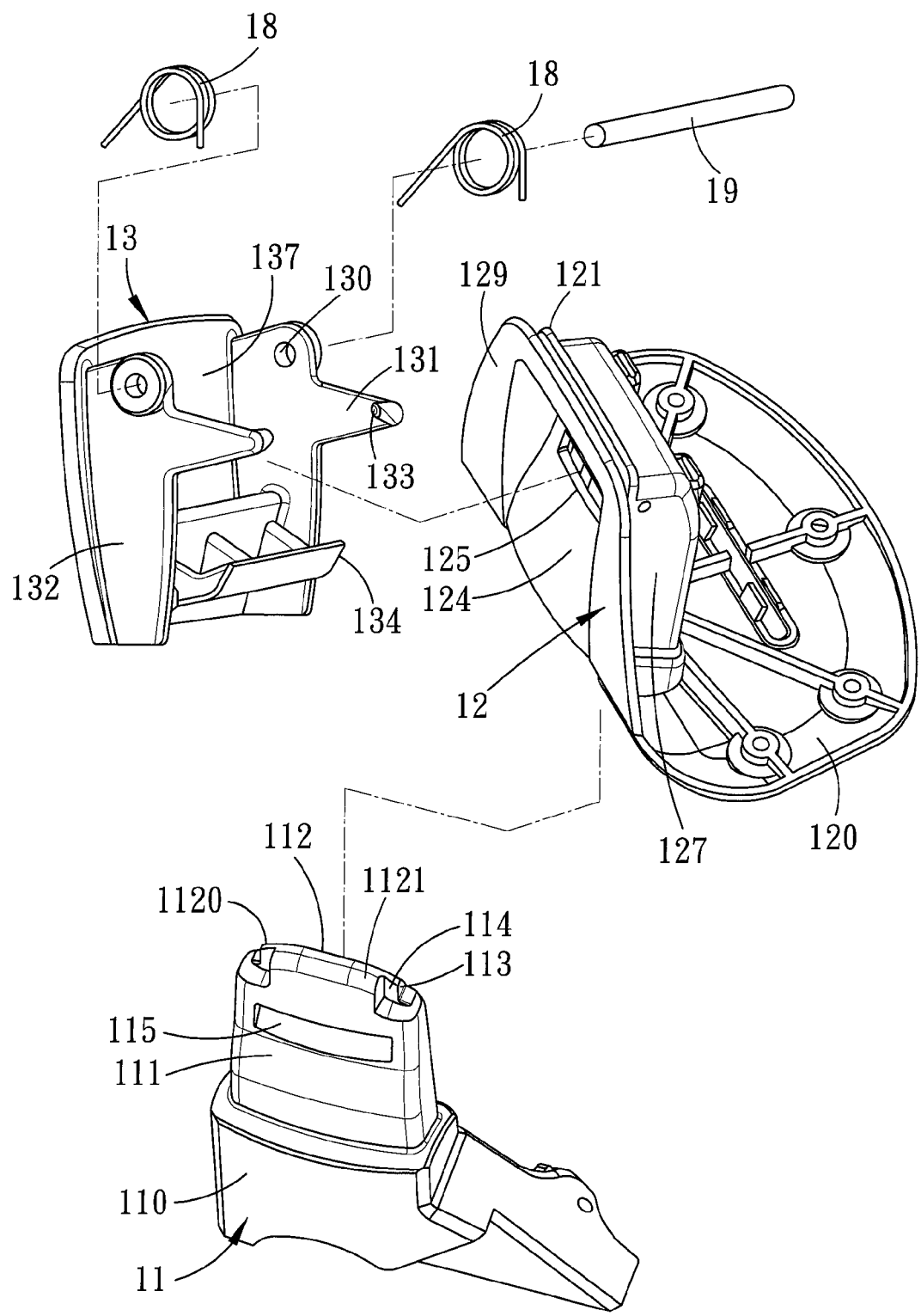
FIG. 2 is an exploded perspective view of the preferred embodiment.

Referring to FIG. 2, the latch device comprises a latch tongue 11, a latch housing 12 and a locking member 13.

Further referring back to FIGS. 1 and 9, the latch tongue 11 is adapted to be mounted on an inner side of the coupling member 102, and has a base portion 110 and a tongue body 111 that is connected to a top end of the base portion 110. The tongue body 111 has a top end provided with a projection 112. The projection 112 has a middle part 1121, and a pair of flanges 1120 extending respectively from front and rear ends of the middle part 1121. Each of the flanges 1120 is configured to have a thickness smaller than that of the middle part 1121, thereby cooperating with the middle part 1121 to define a shoulder. Each of the flanges 1120 has a distal end that is distal from the middle part 1121 of the projection 112, and that is formed with an inclined cam surface 113 having opposite first and second ends that are proximate to and distal from the shoulder, respectively. Each of the flanges 1120 is further formed with an abutment surface 114 on the shoulder and connected to the first end of the cam surface 113.

In this embodiment, the latch housing 12 includes a horizontal connecting wall 120 adapted to be connected to the carrier 2, and a hollow main body 121 connected to a distal end of the connecting wall 120. The main body 121 includes a hollow surrounding wall 127 connected to the connecting wall 120 and covering the tongue body 111, and a side wall 129 connected to an outer surface of the surrounding wall 127 and cooperating with the surrounding wall 127 to define a receiving space 124 that is opposite to the connecting wall 120 in the left-right direction.

The locking member 13 is connected pivotally to the latch housing 12 and is disposed in the receiving space 124, such that the abutment surfaces 114 of the latch tongue 11 confront the locking member 13. The locking member 13 includes a base plate 137, a pair of parallel side plates 132 connected respectively to opposite sides of the base plate 137, and a pair of latch arms 131 extending respectively from the side plates 132. Each of the side plates 132 is formed with a pin hole 130 above a respective one of the latch arms 131. In this embodiment, the latch device further comprises a pivot pin 19 that is disposed between the side plates 132 and that has opposite ends extending respectively through the pin holes 130 for connecting pivotally the locking member 13 to the latch housing 12. The surrounding wall 127 of the latch housing 12 is formed with a pair of engaging holes 126 (see FIG. 3), and the latch arms 131 extend movably and respectively through the engaging holes 126. In this embodiment, each of the latch arms 131 has a distal end segment that has an inner side facing the other one of the latch arms 131 and provided with a slide block 133. Each of the latch arms 131 is configured to have a length shorter than a distance between the pivot pin 19 and the first engaging member 134. In this embodiment, the locking member 13 further includes a first engaging member 134 that is disposed between the side plates 132 below the latch arms 131 and that is configured as an engaging claw, the latch body 111 further has a second engaging member 115 that is configured as a recess, and the surrounding wall 127 of the latch housing 12 is further formed with a slot 125 that is registered with the second engaging member 115.

The locking member 13 is pivotable relative to the latch housing 12 between a locked position (see FIGS. 3, 3A and 4), where the first engaging member 134 extends through the slot 125 to engage the second engaging member 115 to lock the latch tongue 11 to the locking member 13, and where the slide block 133 of each of the latch arms 131 is adjacent to the second end of the cam surface 113 of the respective one of the flanges 1120, and an unlocked position (see FIGS. 7, 7A and 8), where the first engaging member 134 is disengaged from the second engaging member 115 to unlock the latch tongue 11 from the locking member 13, and where the slide block 133 of each of the latch arms 131 and a respective one of the slide blocks 133 abut against the abutment surface 114 of the respective one of the flanges 1120 so as to maintain the locking member 13 at the unlocked position. The latch device further comprises a resilient member 18 which is configured as a torsion spring mounted on the pivot pin 19 for biasing resiliently the locking member 13 toward the locked position.

Figure 3:
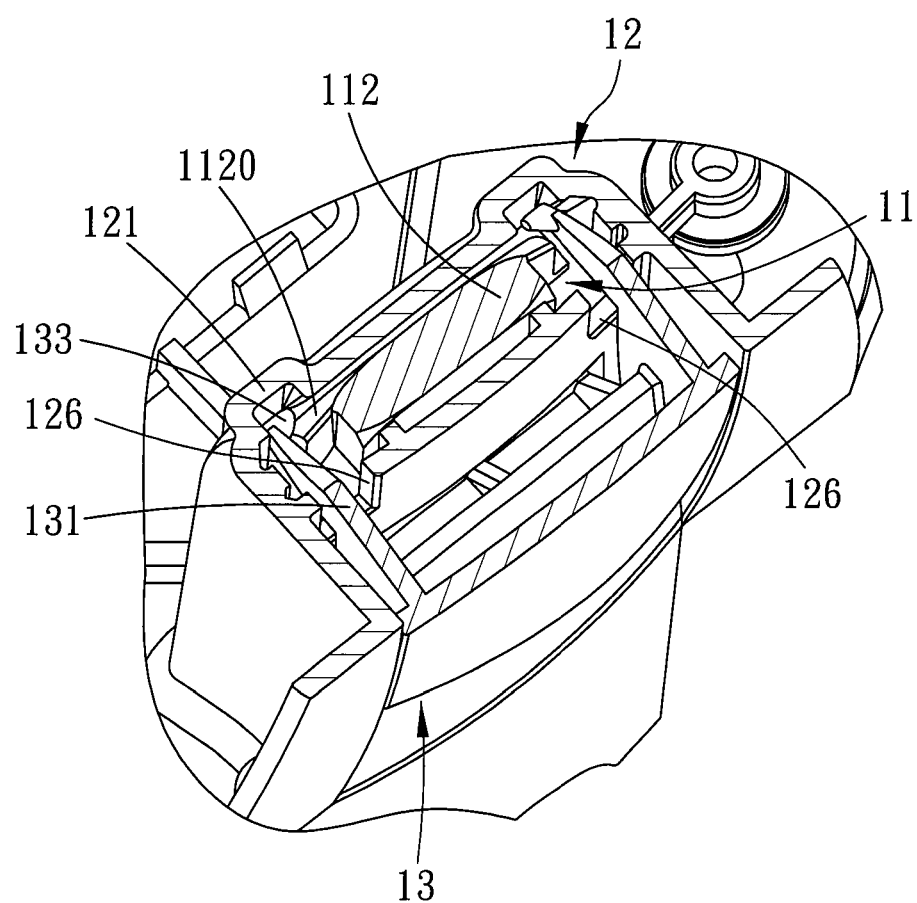
FIG. 3 is a fragmentary sectional perspective view of the stroller, illustrating a locking member of the preferred embodiment at a locked position.
Figure 3A:
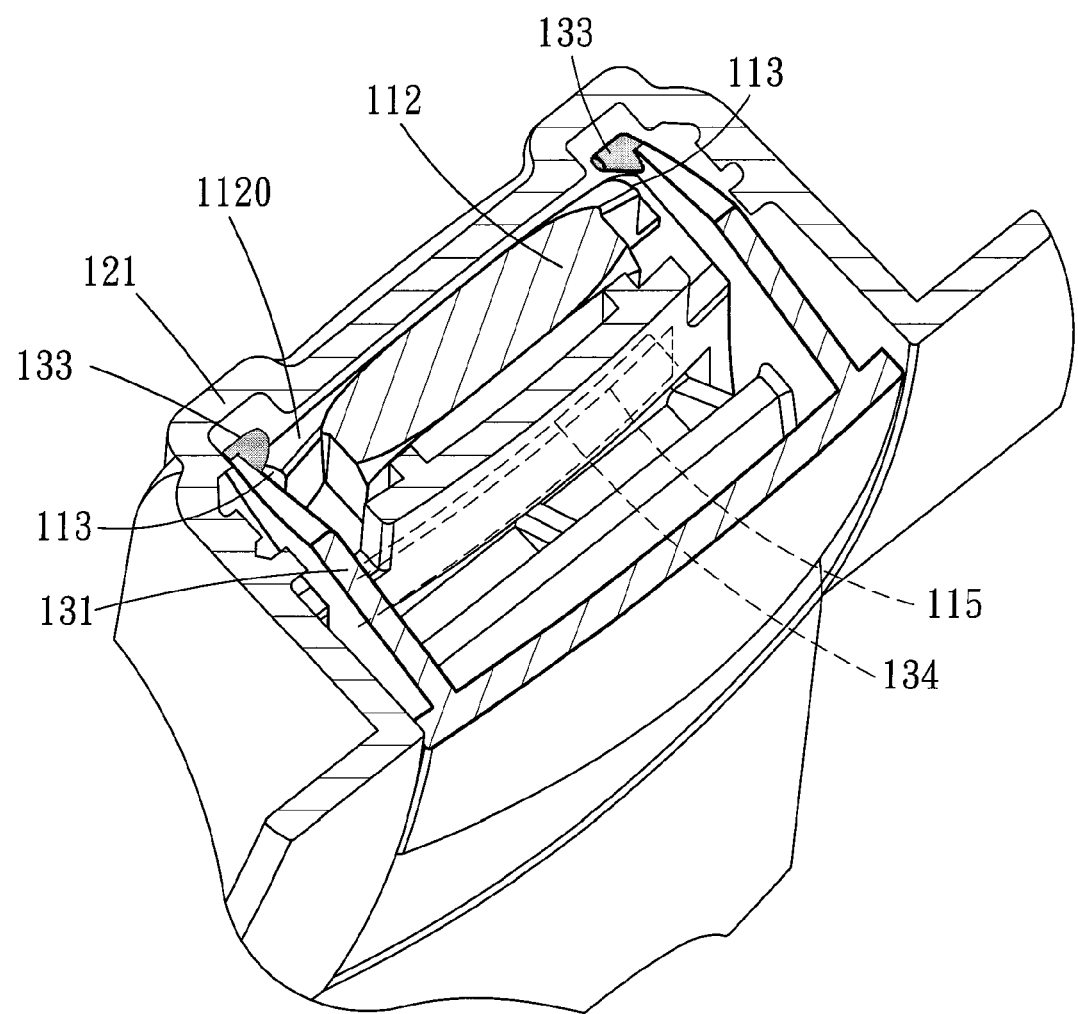
FIG. 3A is a fragmentary cut away perspective view of the preferred embodiment, illustrating the locking member at the locked position.
Figure 4:
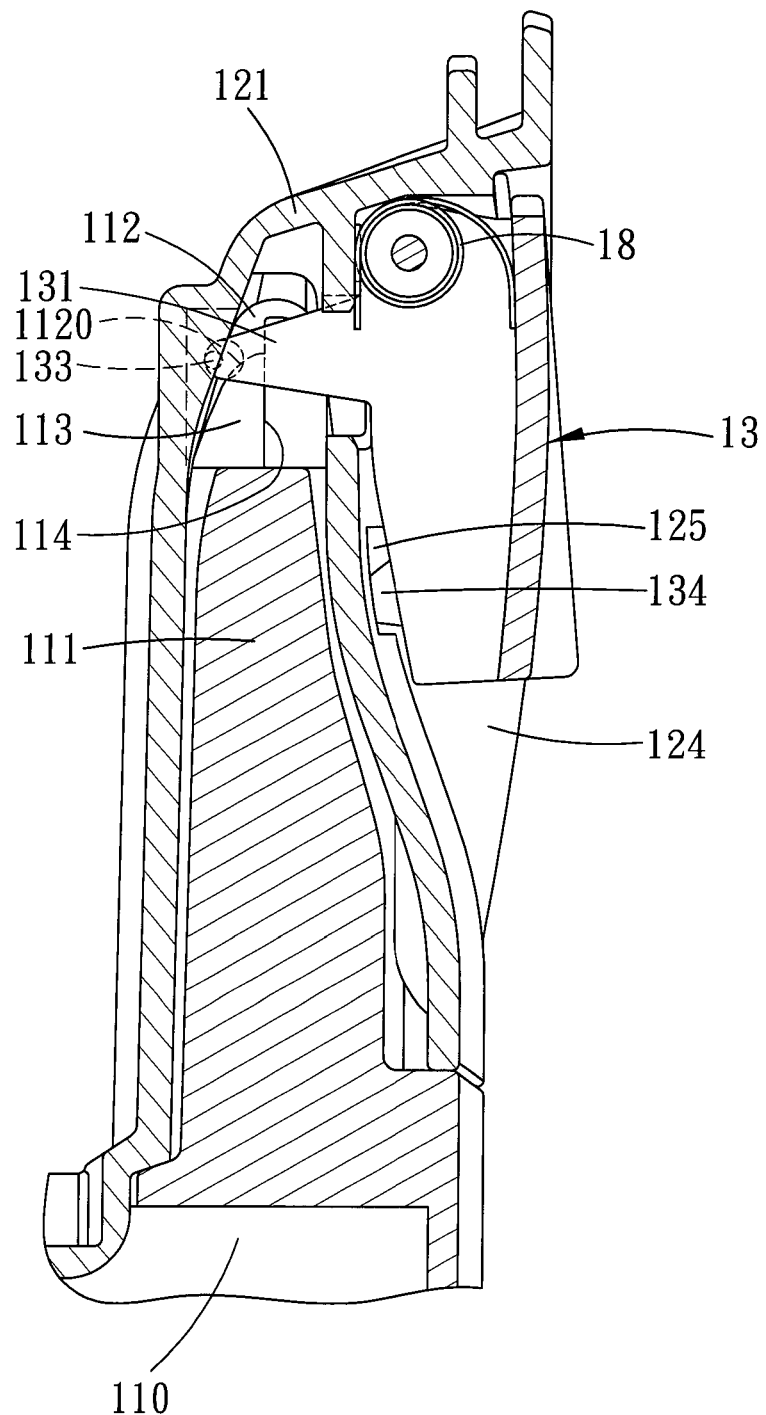
FIG. 4 is a fragmentary side sectional view of the preferred embodiment, illustrating the locking member at the locked position.
Figure 5:
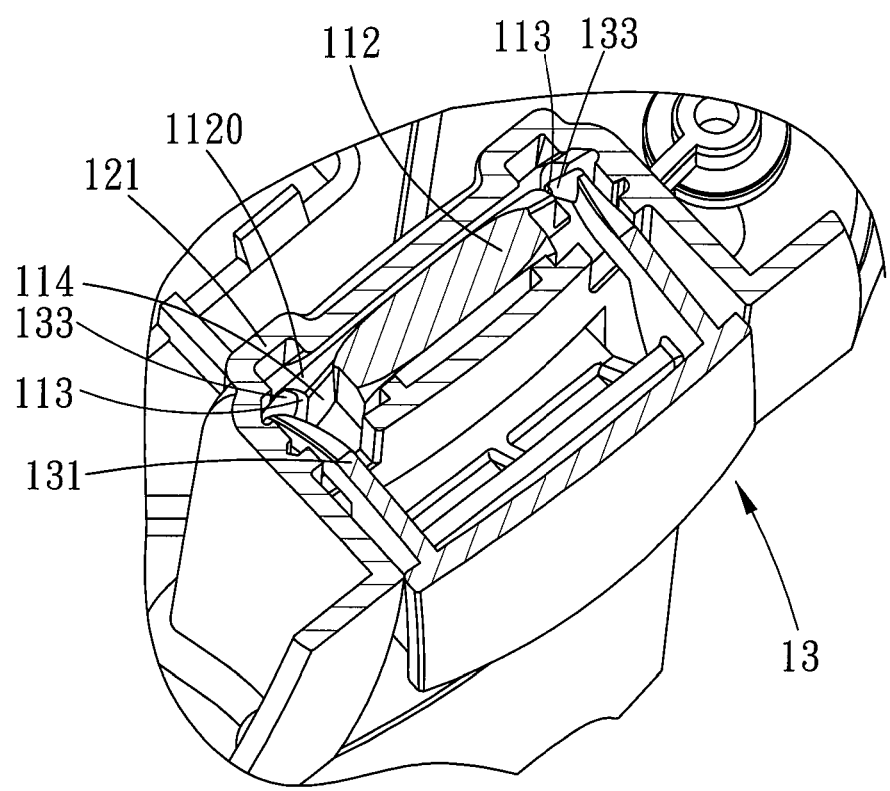
FIG. 5 is another fragmentary sectional perspective view of the stroller, illustrating the locking member of the preferred embodiment being moved from the locked position toward an unlocked position.
Figure 5A:
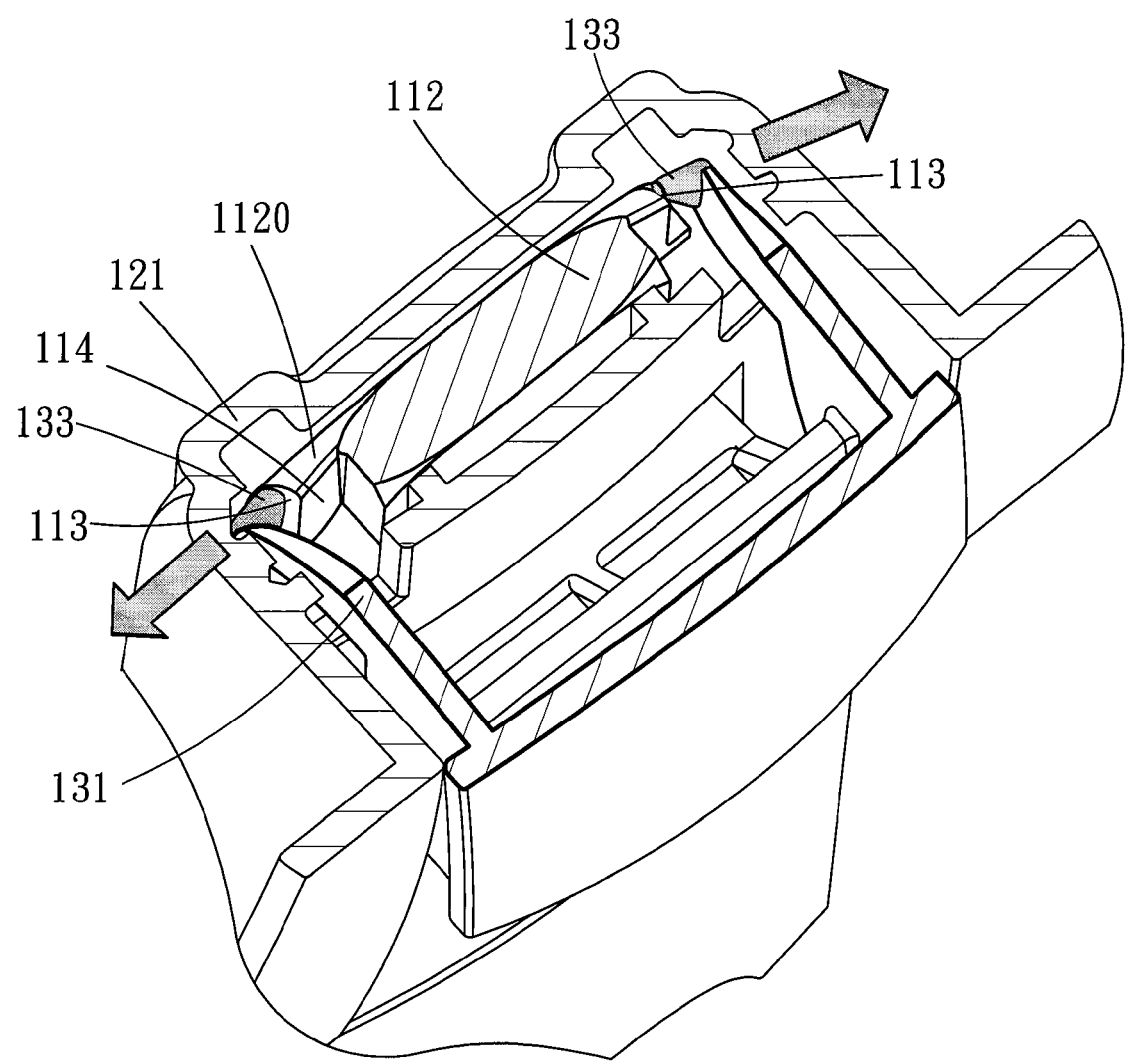
FIG. 5A is another fragmentary sectional perspective view of the preferred embodiment, illustrating the locking member being moved from the locked position toward the unlocked position.
Figure 6:
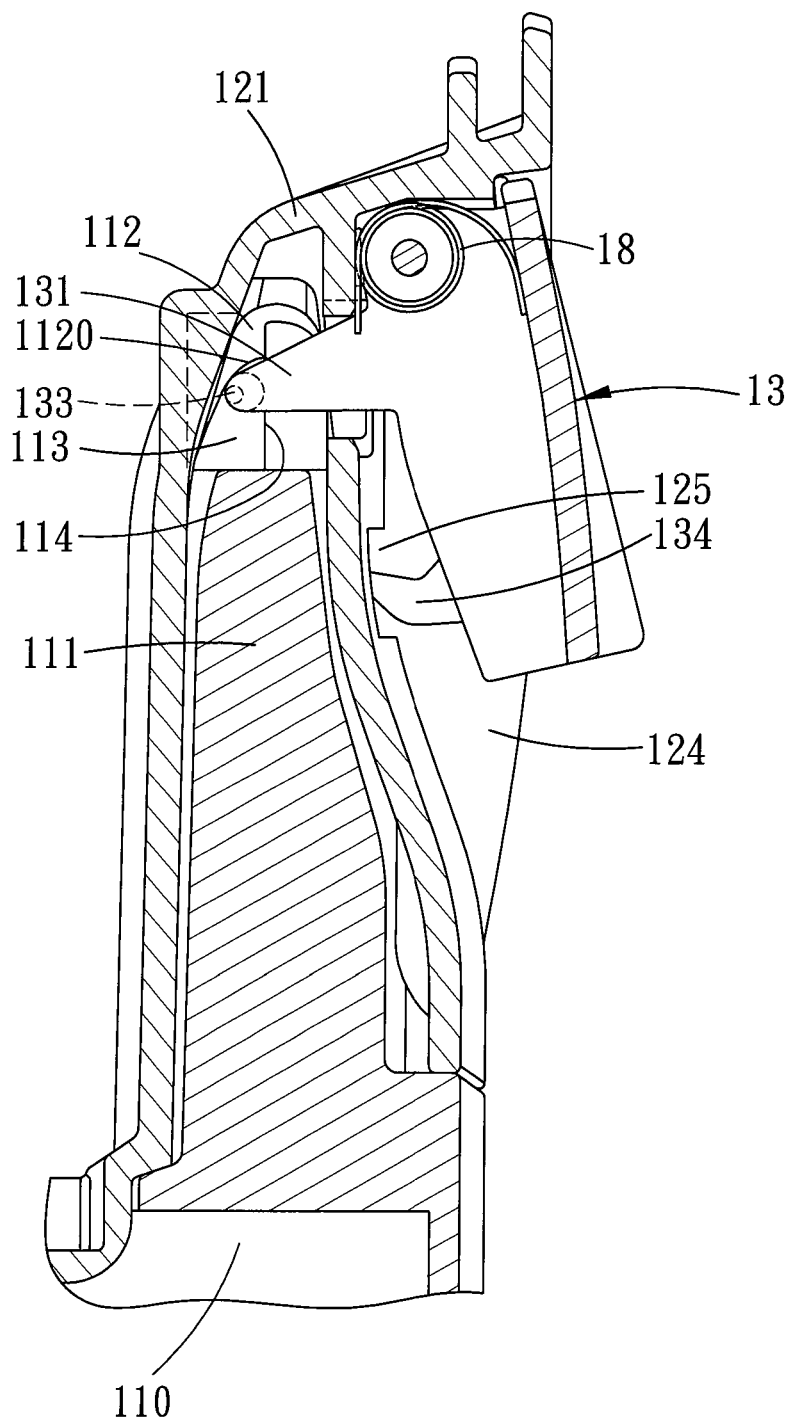
FIG. 6 is another fragmentary side sectional view of the preferred embodiment, illustrating the locking member being moved from the locked position toward the unlocked position.
Figure 7:
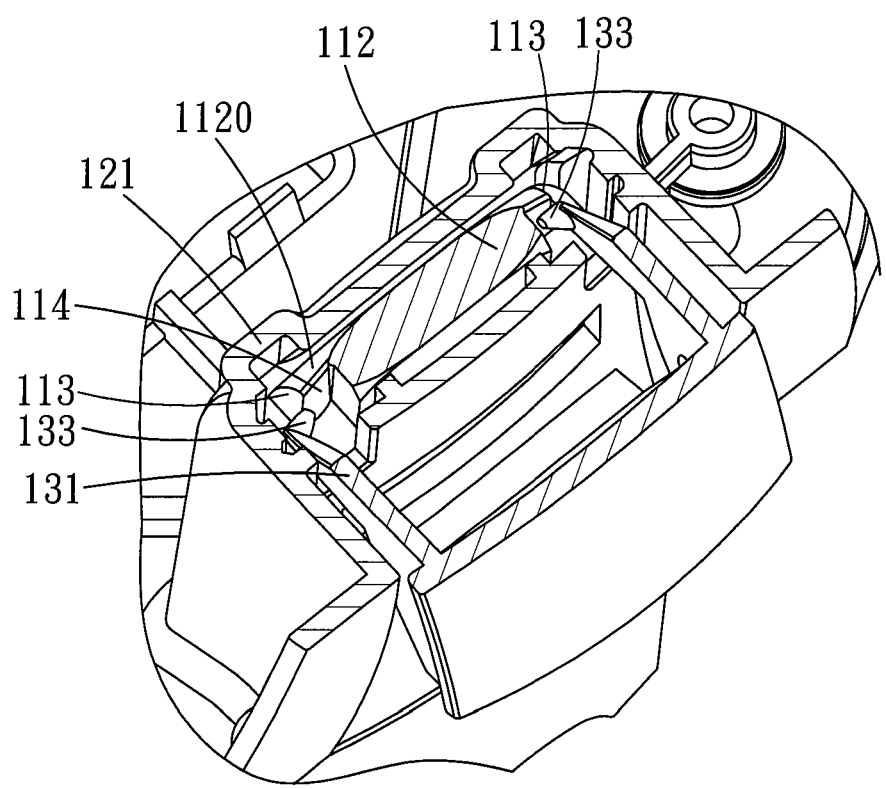
FIG. 7 is still another fragmentary sectional perspective view of the stroller, illustrating the locking member of the preferred embodiment at the unlocked position.
Figure 7A:
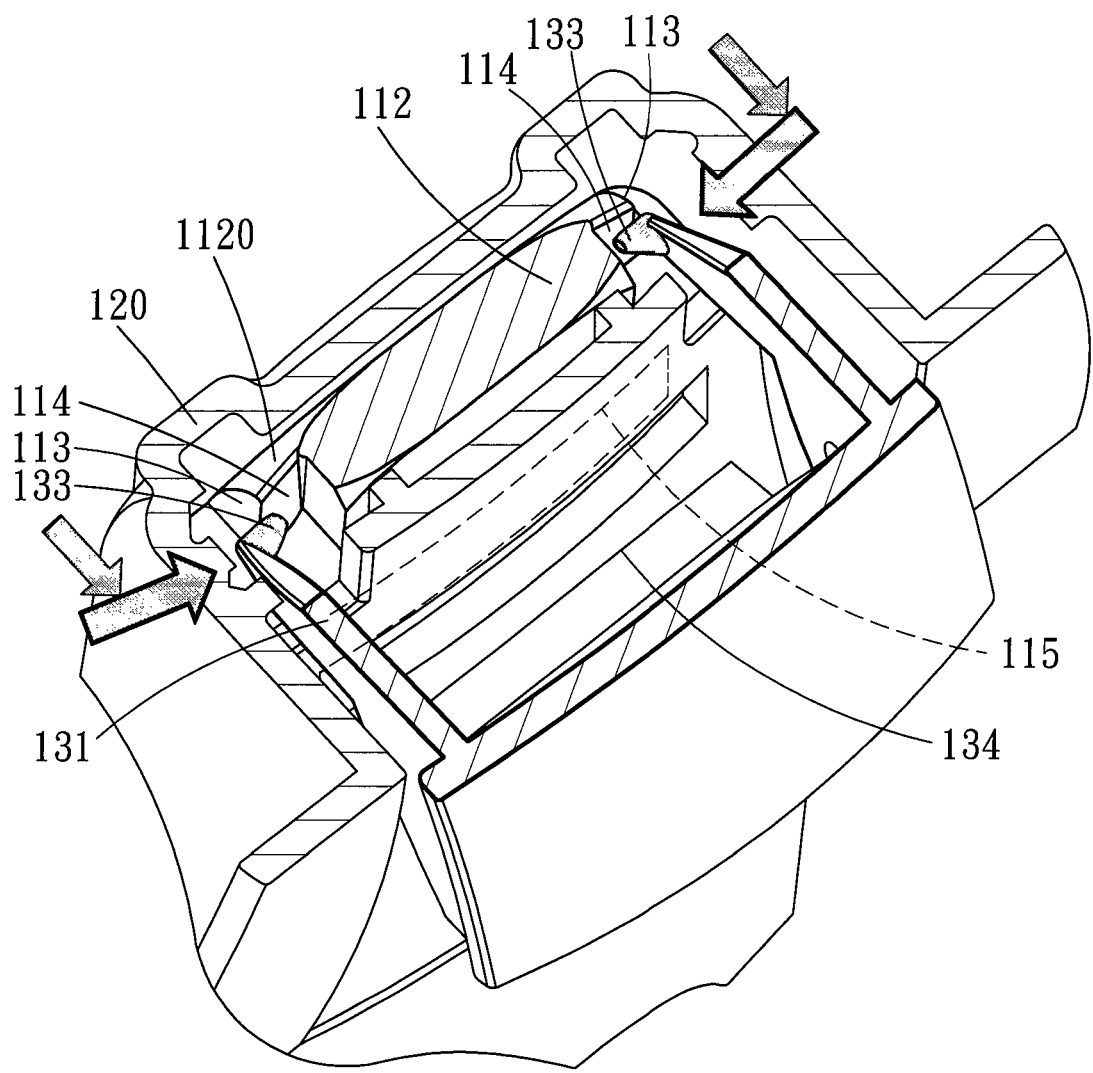
FIG. 7A is still another fragmentary sectional perspective view of the preferred embodiment, illustrating the locking member at the unlocked position.
Figure 8:
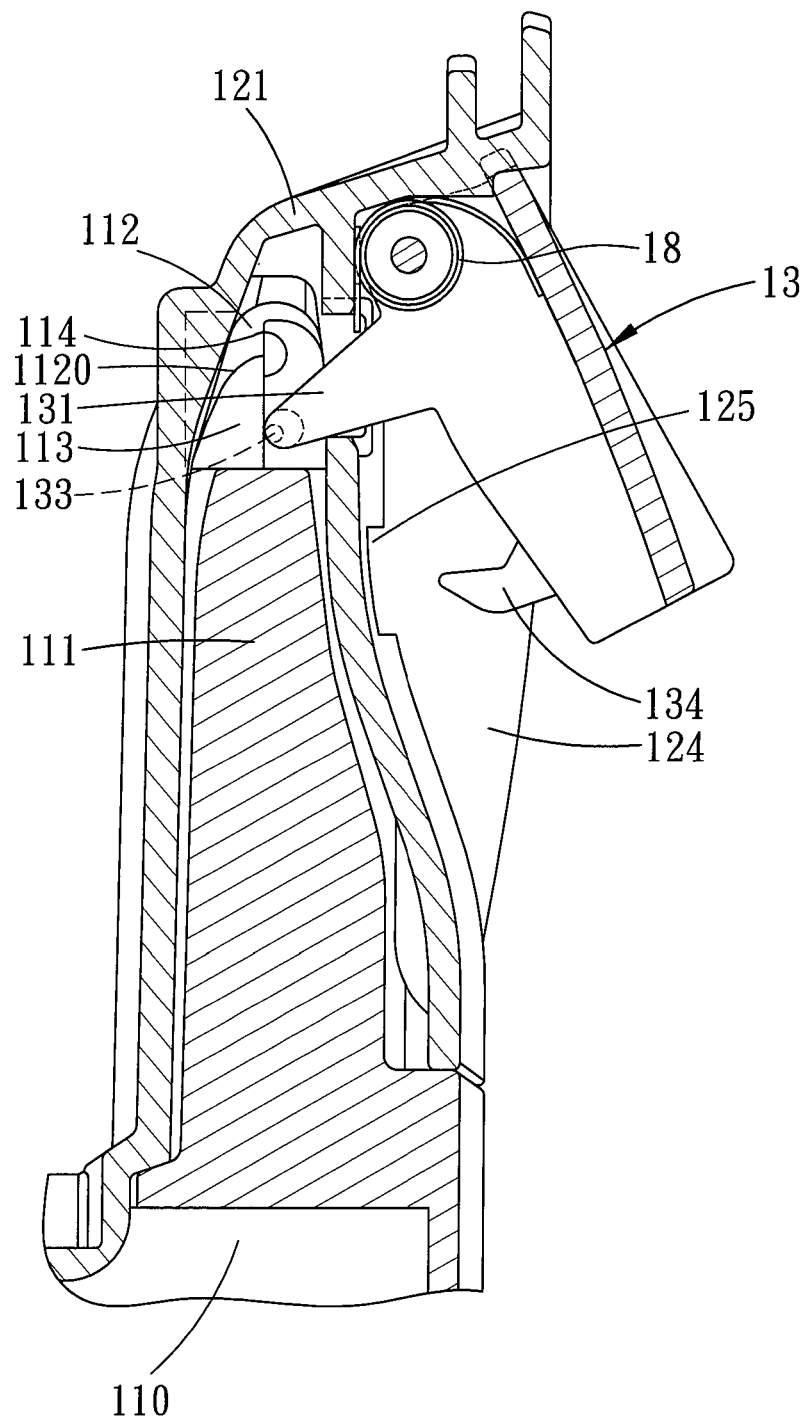
FIG. 8 is still another fragmentary side sectional view of the preferred embodiment, illustrating the locking member at the unlocked position.

The operation of the latch device is shown in FIGS. 3 to 8. Referring to FIGS. 3, 3A and 4, and further referring to FIG. 1, when the carrier 2 is coupled to the stroller frame 10, the surrounding wall 121 of the latch housing 12 covers the tongue body 111 of the latch tongue 11, and the locking member 13 is at the locked position. As shown in FIGS. 5, 5A and 6, when the locking member 13 is pivoted relative to the latch housing 12 from the locked position toward the unlocked position, the latch arms 131 deform resiliently to permit the slide blocks 133 to contact and slide respectively along the cam surfaces 113. Finally, the latch arms 131 restore when the slide blocks 133 depart from the cam surfaces 113 and when the locking member 13 arrives at the unlocked position as illustrated in FIGS. 7, 7A and 8. Since the locking member 13 can hence be maintained at the unlocked position through the abutment of the slide blocks 133 against the abutment surfaces 114, a user is able to hold the carrier 2 with both hands to easily lift the carrier 2 up away from the stroller frame 10. When the user is holding an infant with one hand, the user can still unlock the latch devices separately with the other hand. Moreover, since the locking member 13 appears to protrude from the latch housing 12 when at the unlocked position, the user can easily recognize if the locking member 13 is at the unlocked position.

During the separation of the carrier 2 from the stroller frame 10, when the slide block 133 of the locking member 13 of each latch device is lifted away from the respective abutment surface 114, the locking member 13 is biased to the locked position via the resilient member 18.

Figure 9:
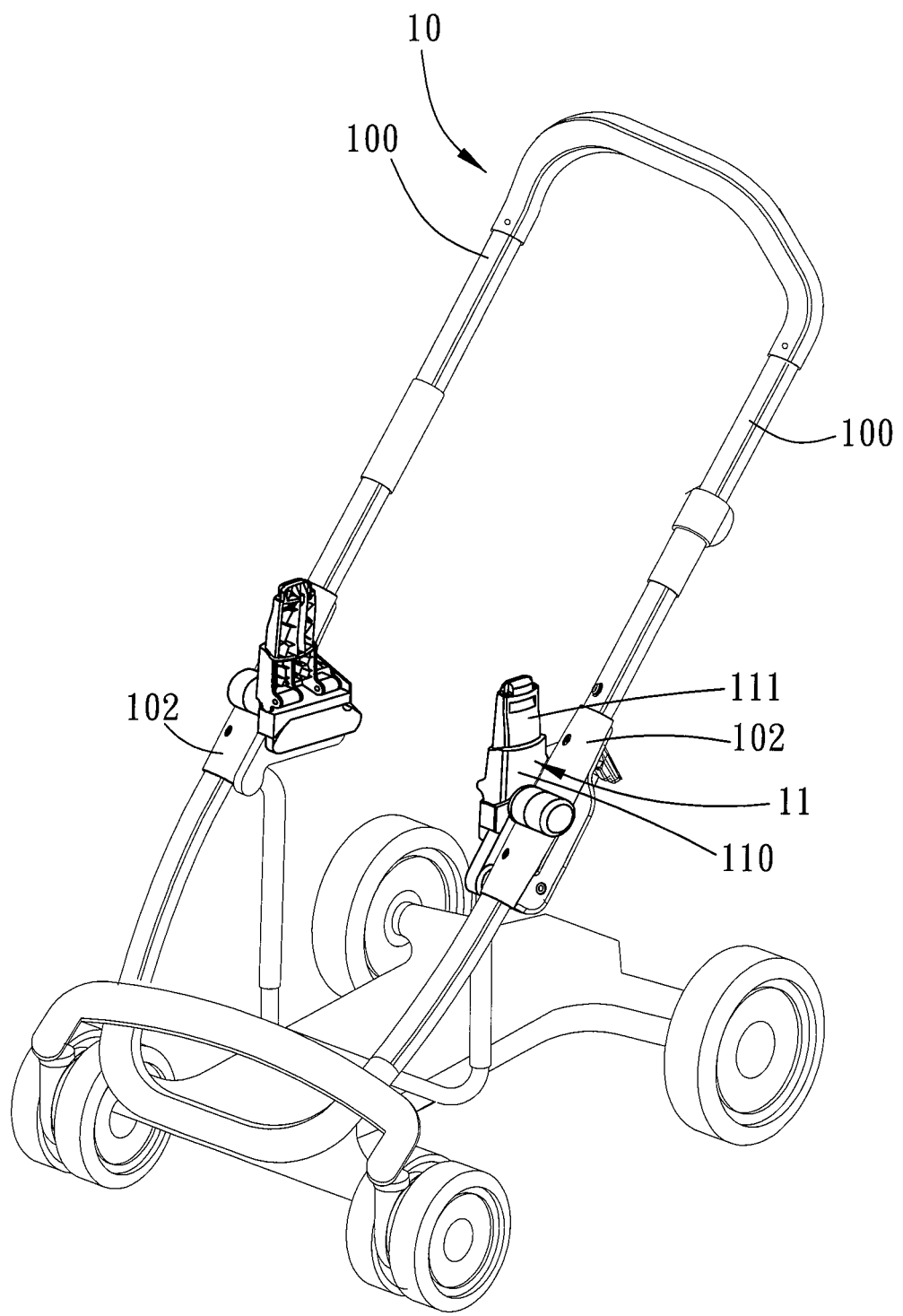
FIG. 9 is a perspective view of the stroller without a carrier.
Figure 10A:
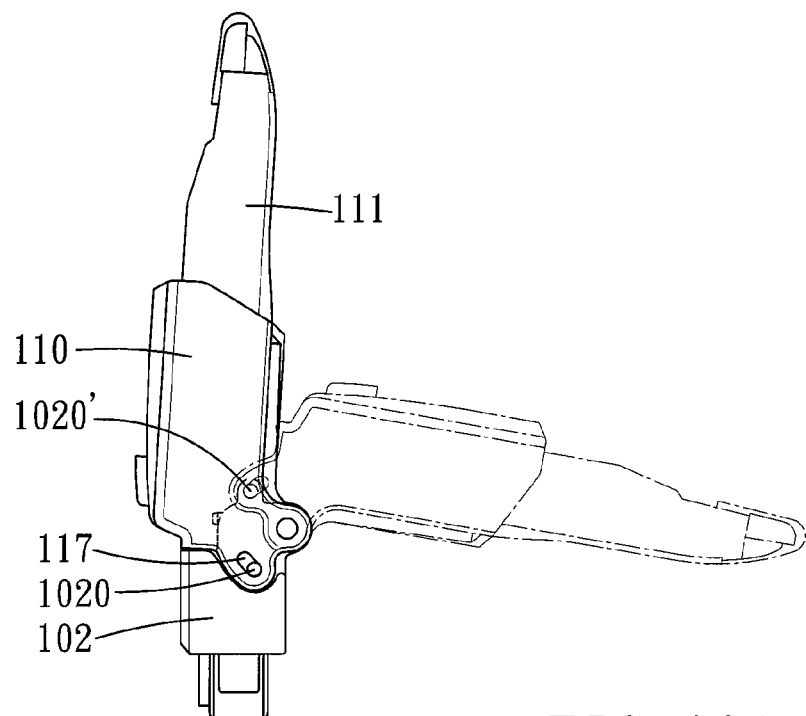
FIG. 10A is a side view of the preferred embodiment, illustrating an operation of a latch tongue between an unfolded state and a folded state.
Figure 10B:
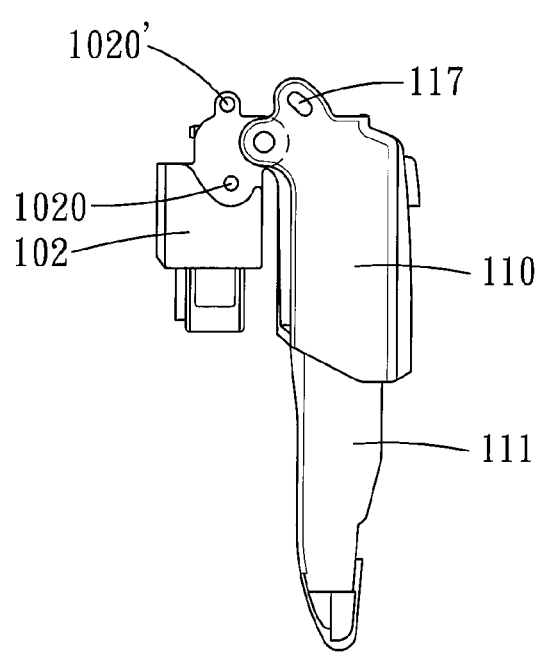
FIG. 10B is another side view of the preferred embodiment, illustrating the latch tongue at a drooping state.
Figure 11:
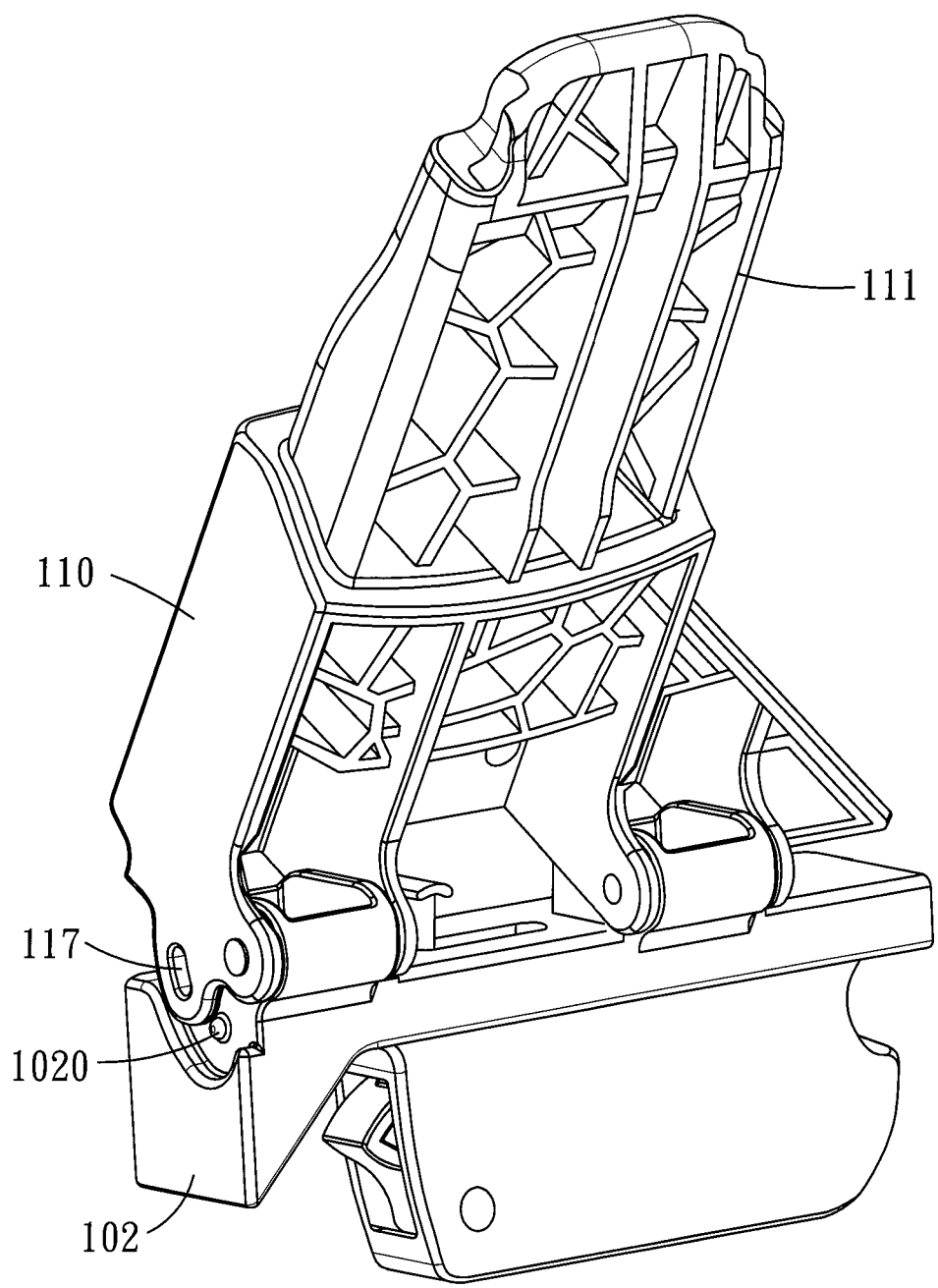
FIG. 11 is a perspective view of the latch tongue and a coupling member of the preferred embodiment.

As shown in FIGS. 9 to 11, another advantage of the latch device of the present invention resides in that the latch tongue 11 is movable relative to the stroller frame 10 between an unfolded state (illustrated in solid lines in FIG. 10A) and a folded state (illustrated in dotted lines in FIG. 10A). For each latch device, the base portion 110 of the latch tongue 11 has a lateral side formed respectively with a curved engaging hole 117. Each coupling member 102 of the stroller frame 10 has a lateral side provided with a pair of spaced-apart spring pins 1020, 1020'. When the latch device is in use, one of the spring pins 1020 engages an end of the engaging hole 117 to retain the latch tongue 11 at the unfolded state. After use, the latch tongue 11 can be pushed to move from the unfolded state to the folded state. During the initial step of the abovementioned movement of the latch tongue 11, the one of the spring pins 1020 is disengaged from the end of the engaging hole 117 and abuts against the other end of the engaging hole 117 (as illustrated in solid lines in FIG. 10A). When the latch tongue 11 is further pushed, the one of the spring pins 1020 is extracted and disengaged from the engaging hole 117 so as to permit the movement of the latch tongue 11 until the other one of the spring pins 1020' engages the engaging hole 117 (as illustrated in dotted lines in FIG. 10A), such that the latch tongue 11 is maintained in the folded state. When the stroller frame 10 is folded and the latch tongue 11 of each latch device is moved to the folded state after the removal of the carrier 2, the stroller can be conveniently transported and stored.

In addition, when the latch tongue 11 is at the folded state, it can be further pushed to force the spring pin 1020' to disengage from the engaging hole 117 so as to permit the latch tongue 11 to move from the folded state to a drooping state (see FIG. 10B). During the folding action of the stroller frame 10, the user can position the latch tongue 11 at the drooping state so as to avoid breaking the latch tongue 11 by accidentally placing the carrier 2 thereon.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A latch device adapted for coupling detachably a carrier to a stroller frame, said latch device comprising:
    a latch tongue adapted to be mounted on the stroller frame, and having a cam surface and an abutment surface that is adjacent to said cam surface;
    a latch housing coupled detachably to said latch tongue and adapted to be connected to the carrier; and
    a locking member including a latch arm, and movable relative to said latch housing between a locked position, where said latch tongue is locked to said locking member, and an unlocked position, where said latch tongue is unlocked from said locking member and said latch arm abuts against said abutment surface of said latch tongue so as to maintain said locking member at the unlocked position;
    wherein said latch arm deforms resiliently to slide along said cam surface of said latch tongue when said locking member is moved from the locked position toward the unlocked position.

2. The latch device as claimed in claim 1, wherein:
    said cam surface has a first end connected to said abutment surface, and a second end opposite to said first end;
    said latch arm has a slide block adjacent to said second end of said cam surface of said latch tongue; and
    the resilient deformation of said latch arm permits said slide block to slide along said cam surface during the movement of said locking member from the locked position toward the unlocked position, said latch arm restoring when said slide block departs from said cam surface and said locking member arrives at the unlocked position.

3. The latch device as claimed in claim 1, wherein said locking member is connected pivotally to said latch housing.

4. The latch device as claimed in claim 3, wherein said locking member further includes a first engaging member that engages said latch tongue when said locking member is at the locked position.

5. The latch device as claimed in claim 4, further comprising a resilient member for biasing resiliently said locking member toward the locked position.

6. The latch device as claimed in claim 4, wherein said first engaging member of said locking member is disposed below said latch arm.

7. The latch device as claimed in claim 4, wherein said latch tongue further has a second engaging member engaging said first engaging member of said locking member when said locking member is at the locked position, and being disengaged from said first engaging member when said locking member is at the unlocked position.

8. The latch device as claimed in claim 7, wherein said latch housing includes:
    a connecting wall adapted to be connected to the carrier; and
    a surrounding wall connected to said connecting wall, covering said latch tongue, and formed with a slot that is registered with said second engaging member, said first engaging member of said locking member extending through said slot and engaging said second engaging member of said latch tongue when said locking member is at the locked position.

9. The latch device as claimed in claim 7, wherein:
    said first engaging member of said locking member is configured as a claw; and
    said second engaging member of said latch tongue is configured as a recess.

10. The latch device as claimed in claim 1, wherein:
    said latch tongue has a top end provided with a projection;
    said cam surface is inclined and is formed on an end of said projection; and
    said abutment surface is formed on said projection and confronts said locking member.

11. The latch device as claimed in claim 5, wherein:
    said locking member includes a base plate and a pair of parallel side plates that are connected respectively to opposite sides of said base plate, said latch arm extending from one of said side plates; and
    said latch device further comprising a pivot pin that is connected between said side plates for connecting pivotally said locking member to said latch housing, and that is mounted with said resilient member.

12. The latch device as claimed in claim 11, wherein:
    said pivot pin is disposed above said latch arm; and
    said latch arm has a length shorter than a distance between said pivot pin and said first engaging member.

13. A stroller comprising:
    a stroller frame including a pair of lateral frame rods and a coupling member that is mounted on one of said lateral frame rods;
    a carrier coupled detachably to said stroller frame; and
    a latch device including
        a latch tongue that is mounted on said coupling member of said stroller frame, that has a cam surface and an abutment surface adjacent to said cam surface, and that is movable between an unfolded state and a folded state,
        a latch housing that is connected to said latch tongue and that is coupled detachably to said carrier, and
        a locking member that includes a latch arm, and movable relative to said latch housing between a locked position, where said latch tongue is locked to said locking member, and an unlocked position, where said latch tongue is unlocked from said locking member and said latch arm abuts against said abutment surface of said latch tongue so as to maintain said locking member at the unlocked position, said latch arm deforming resiliently to slide along said cam surface of said latch tongue when said locking member is moved from the locked position toward the unlocked position.

14. The stroller as claimed in claim 13, wherein:
    said cam surface has a first end connected to said abutment surface, and a second end opposite to said first end;
    said latch arm has a slide block adjacent to said second end of said cam surface of said latch tongue; and
    the resilient deformation of said latch arm permits sliding movement of said slide block along said cam surface during the movement of said locking member from the locked position toward the unlocked position, said latch arm restoring when said slide block departs from said cam surface and said locking member arrives at the unlocked position.

15. The stroller as claimed in claim 14, wherein:
    said latch tongue has a lateral side formed with an engaging hole;
    said coupling member of said stroller frame has a lateral side provided with a pair of spaced-apart spring pins; and said engaging hole engages one of said spring pins when said latch tongue is at the unfolded position, and engages the other one of said spring pins when said latch tongue is at the folded position.

16. The stroller as claimed in claim 14, wherein said locking member is connected pivotally to said latch housing.

17. The stroller as claimed in claim 16, wherein said locking member further includes a first engaging member that engages said latch tongues when said locking member is at the locked position, and that is disengaged from said first engaging member when said locking member is at the unlocked position.

18. The stroller as claimed in claim 17, wherein said latch device further includes a resilient member for biasing resiliently said locking member toward the locked position.

19. The stroller as claimed in claim 17, wherein said latch tongue further has a second engaging member engaging said first engaging member of said locking member when said locking member is at the locked position.

20. The stroller as claimed in claim 19, wherein said latch housing includes:
   a connecting wall coupled detachably to said carrier; and
   a surrounding wall connected to said connecting wall, covering said latch tongue, and formed with a slot that is registered with said second engaging member, said first engaging member of said locking member extending through said slot and engaging said second engaging member of said latch tongue when said locking member is at the locked position.

* * * * *